Jan. 13, 1970  E. D. GRIFFITH ET AL  3,489,240
SEISMIC METHOD

Filed May 4, 1967  2 Sheets-Sheet 1

INVENTORS
Edward D. Griffith
Horace R. Crawford
BY Thomas G. Harwood
ATTORNEY

Jan. 13, 1970     E. D. GRIFFITH ET AL     3,489,240
SEISMIC METHOD
Filed May 4, 1967     2 Sheets-Sheet 2
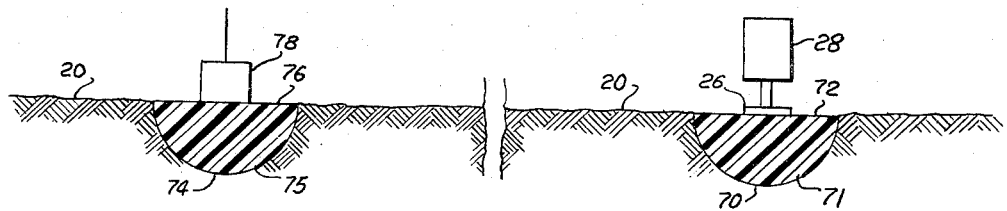
Fig. 5
Fig. 6
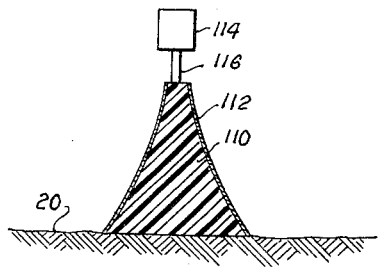
Fig. 7
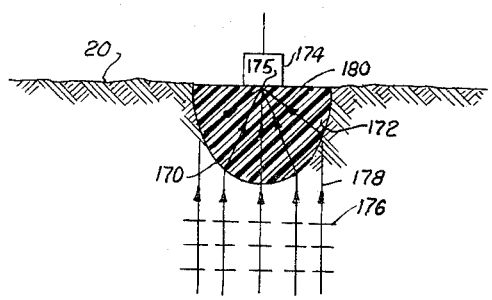
Fig. 9
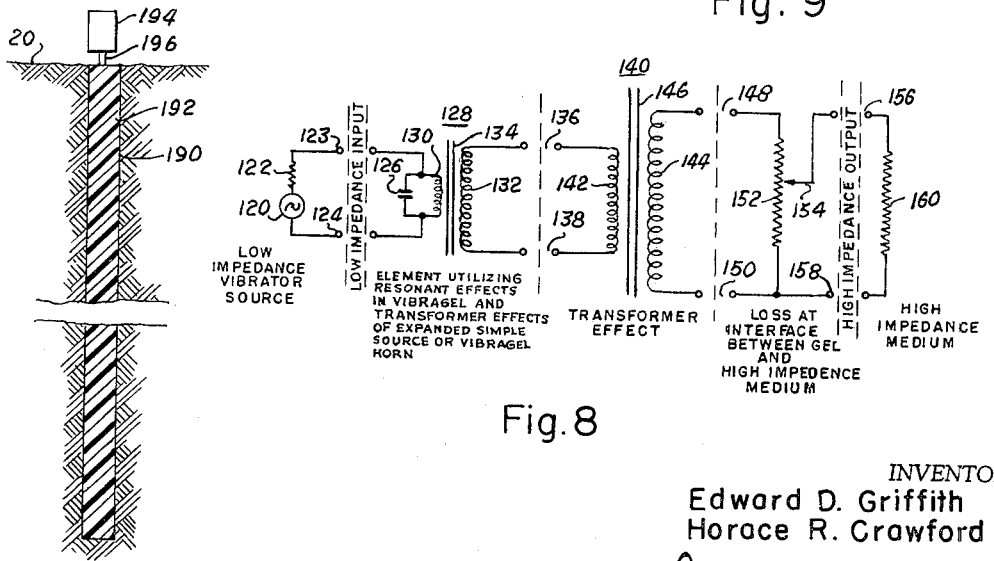
Fig. 8
Fig. 10
INVENTORS
Edward D. Griffith
Horace R. Crawford
BY Thomas G. Harwood
ATTORNEY

United States Patent Office 3,489,240
Patented Jan. 13, 1970

3,489,240
SEISMIC METHOD
Edward D. Griffith and Horace R. Crawford, Dallas, Tex., assignors to The Western Company of North America, Fort Worth, Tex., a corporation of Delaware
Filed May 4, 1967, Ser. No. 636,125
Int. Cl. G01v 1/00; G10k 11/00
U.S. Cl. 181—.5          8 Claims

ABSTRACT OF THE DISCLOSURE

An elastic gel material having low internal friction or damping is employed as an efficient coupling medium between a relatively low impedance energy source or receiver and the relative high impedance geologic formations of the earth. The gel is formed from the liquid state and sets to a gel in the solid state to permit placement of the coupler material in intimate contact with the earth in any desired shape. Improved seismic systems are provided which employ the gel coupling material.

---

A predominate problem in seismic methods is in achieving efficient coupling of energy from an external source into geologic formations in the earth, and reconverting the seismic energy propagating in the earth into mechanical energy at the geophone or sensor. Typically, efficiencies as low as $10^{-7}$ are common when attempting to introduce seismic energy with a mechanical vibrator into a high impedance medium such as granite rock. Somewhat greater efficiencies are possible when working into other formations such as the weathered layer that covers most of the earth, but the percentage of available energy transformed into seismic waves is still quite small. Conversely, the energy sensed by a geophone suffers from this same inefficient transfer at the earth-transducer interface. It is with reference to the efficient coupling at either the energy input or energy output of a seismic system that the present invention is directed.

Several reasons exist for the inefficient coupling of seismic energy across the earth-transducer interface in seismic systems. In general, these reasons can be described in terms of impedance mismatches between the transducers and the earth medium, and in mechanical losses in the earth medium.

Seismic waves that can be propagated for significant distances in the earth are restricted to relatively low frequencies from a fraction of a cycle per second to about 200 cycles per second. These low frequencies combined with seismic velocities in geologic formations that range from a few hundreds of feet per second in soft weathered layers to several thousands of feet per second in hard rock provide wavelengths for seismic energy in the earth ranging from many feet to thousands of feet. Therefore, in almost every case, the dimensions of the energy source or receiver used in seismic systems are small compared to the wavelength of the seismic energy to be generated or received.

Whenever the dimensions of the source are small compared to the wavelength of the radiated energy in the propagation medium, a "small" or "simple" source condition exists. It is well known that inefficient conversion of energy results in such a situation. Moreover, the small or simple source difficulty exists, by reciprocity, at the seismic receiver where the seismic wave energy is reconverted into mechanical energy at the geophone. Mathematically this situation can be described in terms of a complex radiation impedance function, Z, as follows, $$Z = R + X$$

where R is the resistive term and X is the reactive term. When the small source condition prevails, the reactive term is large compared to the resistive term. A power factor analogous to electrical terminology can be defined to indicate the efficiency of energy transfer. Efficient energy transfer occurs when the resistance term is large or the power factor approaches unity. This only occurs when the dimensions of this source or receiver approach the dimensions of the wavelength of the signal in the propagation medium. On the other hand, even though radiation efficiencies for a small source are quite low, significant relative improvement in efficiencies can be gained by enlarging the dimensions of a small source. It can be shown that the power, P, radiated by a small hemispherical source, for example, is given by $$P = Ka^4 \dot{x}^2$$

where $a$ is the source radius, $\dot{x}$ is the particle velocity at the interface between the source and the medium, and K is a constant. Therefore, for small source conditions an increase in dimensions will result in greater radiation if the velocity is maintained a constant.

Many factors are involved in the efficient conversion of seismic energy at the transducer-earth interface, some of which have been mentioned above. Another is the basic impedance mismatch of the mechanical vibrator to the earth medium. Most vibrators, either of an electrodynamic or hydraulic design, can be described by a maximum output force, F, and the mass, $m$, of the moving element by the simple equation relating these factors and acceleration, $\ddot{x}$, as follows:

$$F = m\ddot{x}$$

Considering only maximum values, acceleration can be related to velocity, $\dot{x}$, by the equation $$\ddot{x} = \omega \dot{x}$$

where $\omega$ is the angular frequency of vibration, or $$\omega = 2\pi f$$

and where the frequency, $f$, is the reciprocal of the period, T, of the signal or $$f = 1/T$$

Therefore, the force is related to velocity by $$F = m\omega \dot{x}$$

Since mechanical impedance, Z, is defined as the ratio of force to velocity as $$Z = F/\dot{x}$$

and Z can be related to $\omega$ then $m$ as $$Z = \omega m$$

That seismology deals with low frequencies has been noted elsewhere above, and it is well known that the mass of the moving element is minimized in order to waste as little force as possible in accelerating this mass during the normal duty cycle of the vibrator. Since $\omega$ and $m$ are both low, the resulting output impedance of the vibrator is necessarily low.

The characteristic impedance of the geologic medium is given by the accepted equation $$Z = \rho c$$

where $\rho$ is the density of the medium and $c$ is the velocity of seismic wave propagation in the medium. Since the density and velocity of propagation are both high for geologic media, the input impedance of the formations in the earth can usually be considered high. Therefore, there is a fundamental mismatch of impedance when using a vibrator to generate seismic energy in the earth.

Mechanical problems also exist when attempting to couple vibratory or pulse energy to the earth for the purpose of generation of seismic waves. Several reasons have already been given that indicate severe impedance mismatch between the source of energy and the geologic medium. To overcome these difficulties at the source, great forces from very large energy sources are often utilized to generate appreciable seismic energy in the earth even though transfer efficiency is small. In such a case, it is usually necessary to drive the earth to large vibratory displacements and velocities. However, geologic formations are usually stiff and brittle, and have relatively low fatique limits. When subjected to large particle displacements, fracturing occurs and the medium responds to excitation with inelastic deformations, since a direct relation exists between particle displacement and particle velocity, and since the limitation on displacement by fatigue of the medium places a corresponding limitation of velocity of vibratory excitation. If on the other hand, these limits are exceeded and inelastic deformation occurs, significant amounts of energy are lost by this fracturing process.

Frictional forces also account for energy losses. Even at lower excitation levels within the fatigue limits of the medium, internal damping or friction in the medium can cause significant dissipation of excitation energy. In the case of large excitation amplitudes and fracturing phenomena in the medium, these frictional forces are multiplied.

In summary, mechanical energy created by the seismic source can be distributed into three budgets; namely, losses in inelastic deformation and fracturing, in frictional losses, and energy going into elastic wave generation. Obviously, it is desirable to minimize the losses and maximize the energy introduced into the earth as elastic waves.

In more specific terms, the various reasons for inefficient coupling at the energy input and energy output of seismic systems discussed above present two basic problems that must be solved before efficient coupling of mechanical energy for seismic purposes can be achieved. First, a low impedance coupling medium with relatively unlimited displacement excursion and extremely low internal friction must be provided. Secondly, an appropriate configuration for the coupler must be provided so that it will act as a transformer to match impedances of the source and medium. This transformer effect can be achieved either by spreading available energy over a large area of surface on the earth medium to produce a coherent source of approaching at least a half wavelength of the signal in the medium, by simply expanding the small or simple source, or by providing coherent energy over a large area having the maximum excitation limit of the medium.

It can be stated as a broad objective of this invention to provide a system and method to effect the efficient conversion of mechanical energy into seismic energy propagating in the earth, and to reconvert the seismic energy to mechanical energy at a geophone or other sensor.

It is also an object to provide a system and method that has use in any other application where seismic wave propagation is used. For example, one of the most difficult problems in wars of subversive insurgency is the detection of intruders into air fields, base camps and patrol bivouacs. A system is therefore needed to detect intruders that has a configuration and weight so that it can be carried without decreasing the effectiveness of the patrol and its basic mission. The system must also be easily installed and dismantled for patrol bivouac use, since camps are regularly moved on a daily basis. Thus, it is an object to provide a system and method that is efficient for detection purposes and meets the special requirements of this particular application.

In accordance with the above objects and requirements, the present invention, in a preferred embodiment, provides a system and method for the efficient conversion of seismic energy propagated within a geologic medium from a relatively low impedance mechanical vibratory source, and the efficient reconversion of this seismic energy to mechanical energy in a detector. A material that can best be described in terms of its characteristics as an organic gel is employed as a coupling or transformer medium between the mechanical vibratory member and the high impedance medium. A preferred embodiment of the gel comprises a large percentage of water, a smaller percentage of dry powder that is comprised of organic monomers, and a catalyst that produces a gelling agent to polymerize the monomers to bind the water in suspension, whereby the gel is mixed in the liquid state to set up as a gel in the solid state. The gel and its characteristics will be described below in detail in conjunction with specific embodiments of the invention. Briefly, however, the gel is elastic, is characterized by a low modulus of elasticity when permitted to deform and will deform to large amplitudes before fracture. The gel is also characterized by very low internal damping. Other characteristics of the gel further enhance its application to a seismic system. Because of the properties of the gel, inelastic deformation at the interface of the geologic medium can essentially be eliminated. Moreover, friction losses are absolutely minimized to maximize the elastic propagation within the geologic medium. Other suitable organic gels can also be employed for this purpose.

Although the simple expediency of employing the gel as a transfer or transformation medium between the mechanical vibrator source or mechanical vibratory geophone and the geologic medium with the gel being disposed in physical contact with the low and high impedance mediums substantially increases the efficiency of coupling, proper seismic system designs can further increase the efficiency. The gel employed in the invention is readily poured in a liquid form and sets as a gel within a controlled period of time. Moreover, the gel is relatively inexpensive. Thus the seismic system and method employed in the invention is highly flexible, since the gel can be poured into any configuration of any desired size and at any desired location.

In the simplest form and application of the invention, a small excavation is made in the earth or geologic medium and the gel is poured into the excavation to form a plug to which is attached the mechanical vibrator or seismic source, or alternatively the geophone or pick-up. In a more elaborate and efficient design, the excavation is made larger so as to provide an expanded "simple" source of larger dimensions, so as to further increase the efficiency of transfer of the seismic energy into the geologic medium. In a further embodiment, a very long bore hole of length approaching one-half the wavelength of long wavelength seismic waves is filled with the gel. Still a further embodiment employs an exponential horn configuration of the gel to provide high radiating efficiency.

Whether the invention takes the form of the simplest plug design situated within the geologic medium or the more sophisticated designs, the system and method of the invention provide a much increased efficiency of coupling between the geologic medium and the mechanical vibratory source or detector.

Many other objects, features and advantages will become readily apparent from the following detailed description of the invention when taken in conjunction with the appended claims and the attached drawing wherein like reference numerals refer to like parts throughout the several figures, and in which:

FIGURE 1 is a side elevational view, in section, of a mass of coupling gel filling a cavity in the earth illustrating the basic system and method of the invention wherein some of the apparatus is shown schematically;

FIGURE 2 are graphical representations of recorded seismic waves received by a geophone in the case of a geophone attached directly to the earth and receiving the seismic energy created from a seismic source, and in the case of a geophone attached in physical contact with a plug of the gel in the earth's surface, wherein the received information illustrated in both cases is otherwise taken under the exact same conditions;

FIGURE 5 is a fragmentary, side elevational view, in section of a seismic source and pick-up or geophone, both of which are positioned in physical contact with a gel plug poured into the earth;

FIGURE 6 is a fragmentary, side elevational view, in section, of several vibratory sources used in conjunction with gel plugs to form a multiple array source to increase the overall effective size and power radiation of the source, used in conjunction with a multiple array of pick-ups used in conjunction with gel plugs;

FIGURE 7 is a side elevational view, in section, of an exponential horn configuration of the gel transfer medium positioned in physical contact with the earth or geologic medium with the mechanical vibratory shaker shown schematically;

FIGURE 8 is the equivalent electrical schematic diagram or electrical analog of the system shown in FIGURE 7;

FIGURE 9 is a side elevational view, in section, of a lens shaped gel body to produce refractions of the seismic sound waves to effect a plane wave propagation in the case of a seismic source, or to focus an essentially plane wave front of seismic energy at the geophone in the case of a pick-up; and FIGURE 10 is a fragmentary, side elevational view, in section, of an extended length bore hole filled with the gel having the mechanical vibrator positioned in physical contact with the gel at the surface of the earth, whereby the length of the bore hole filled with the gel approximates or is equal to the half wavelength of the seismic wave propagated within the earth.

Figure 1:
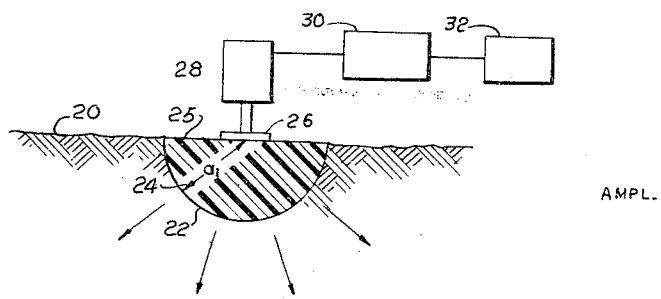

The basic concept of the invention is shown in the elevational view, in section, of FIGURE 1 wherein an excavation 22 is made in the earth or any geologic medium 20, the size of the excavation depending upon the design of the seismic source. The excavation is filled with the gel employed in the invention, which will be described later, by pouring the gel in liquid form into the excavation and allowing the gel to set up as a solid plug 24. A mechanical vibrator or shaker 28, which includes a shaker plate 26 attached thereto, is disposed in physical contact with the surface 25 of the gel plug at the face of the shaker plate, and an amplifier 30 and oscillator 32 are connected to the shaker to drive the shaker from the oscillator source. Any conventional vibrator can be employed, such as an electrodynamic or hydraulic shaker commonly used for this purpose. The amplifier and oscillator are also of any suitable design for this purpose.

It will be seen that a transfer or coupling medium comprising the gel plug 24 is disposed intermediate to and in direct physical contact with the mechanical vibrator and the geologic medium. The shaker plate 26 can be embedded within the top surface of the gel plug as the gel sets from the liquid form so as to form an integral part thereof. Similarly, the gel plug forms a continuation of the geologic medium as it sets from the liquid form to eliminate undesirable interface effects along the excavation surface 22. As the vibrator operates, the mechanical vibrations created in the surface of the gel plug are transferred through the plug into the geologic medium under the conditions and with the effects to be described below.

A description of the gel will be given in terms of its components and characteristics, including an explanation of the increased efficiency of the coupling of seismic energy into the geologic medium that results from the use thereof. A preferred form of the gel that has been found to be suitable for this purpose is the AM-9 (trademark of American Cyanamid Company) material so designated and manufactured by the American Cyanamid Company, New Jersey. This particular gel is constituted of about 89.1% water, 10.0% dry powder comprising AM-9 chemical grout, and 0.9% of a catalyst system comprising 0.4% DMAPN ($\beta$-dimethylaminopropyionitrile), 0.5% ammonium persulfate and a trace of potassium ferricyanide. All of the above percentages refer to parts of chemical per 100 parts of the final gel solution to be prepared. The AM-9 grout is a mixture of two organic monomers—acrylamide and N,N'-methylenebisacrylamide. The DMAPN acts as an activator for the reaction to gel the mixture, the ammonium persulfate acts as an initiator that triggers the reaction to start the gel action, and the potassium ferricyanide controls the reaction as an inhibitor but which can be dispensed with if desired. In normal mixing, 79% water, 10% AM-9 chemical grout and about 0.4% of the catalyst component DMAPN, percentage again based on 100 parts of the final gel solution, are mixed together. Separately, 10% water and 0.5% of the catalyst component ammonium persulfate are mixed together. When gel action is desired, the two solutions are mixed together, and for the percentages specified above with the temperatures of the two solutions at about 68° F., the gel will form in about three minutes, assuming a trace of KFe (potassium ferricyanide) has been added. If not, it will gel in about 1¾ minutes. Changes in gel time can be made by varying the temperature, KFe, and catalyst components DMAPN and AP according to literature published by the American Cyanamid Company.

The above described gel is comprised of the two organic monomers already noted formed in a process by which gelation occurs in a polymerization-crosslinking process, thereby forming a solid matrix which binds the water in the gel. The above percentages, however, are not exclusive. It has been found that the percentage by weight of the AM-9 dry grout powder based on the total weight of water used can be varied from about 2.0% to about 25.0%. It is also found that the modulus of elasticity increases with increasing percentage of the dry powder, and the propagation velocity of sound likewise increases accordingly. The percentage of the dry powder used will depend upon the particular application for which the gel is used, taking into consideration other design factors as will become more apparent below.

From the results achieved by using the above described gel in seismic systems as fully described below, it becomes apparent that other gels will lend themselves to this application. More specifically, the invention contemplates the use of all suitable gels comprised of organic matter which polymerizes to a solid. Polymerization is here intended to include the combining of molecules of the particular organic binder (such as the dry powder above) to form chains or a matrix array. Moreover, because properties of the gel can be varied with varying percentages of the organic binder, percentages of the organic binder are considered from about 0.5% to about 50.0% by weight of the solid gel for different applications.

The general characteristics and properties of the gel are as follows: The gel is translucent with a cloudy appearance, and possesses a very low modulus of elasticity when permitted to deform and will deform to large amplitudes before fracture. The gel is further characterized by low internal damping and a density essentially that of water. The gel is insoluble in water, kerosene and gasoline, and is impermeable to water and hydrocarbons. Under moist conditions, the gel appears unchanged for at least ten years, but in air, the gel will dehydrate. As to the latter, dehydration of the gel does not occur in a time that would prevent it from being employed for seismic purposes or the gel can be held under moist conditions for long terms operations. The gel is resistant to attack by fungi, dilute acids, alkalis, and ordinary salts and gases normally found in the earth. The gel has about the same corrosion effects as water. Fraction of critical damping measured in the gel is a function of configuration as well as inherent resistance to rate of deformation, but such damping measured in these gels is less than in most rubber materials. For example, rubbers can be made with fractions of critical damping from about 0.01 to 0.50 for a given situation. In the same situation, fractions of critical damping can be achieved for the gel from about 0.0001 to the same maximum value as a rubber. Variations in dynamic properties can be obtained with appropriate additives, to be further described below.

It will be helpful to point out some of the radiation theory for seismic waves into the earth so that the gel characteristics and designs to be described below will be seen to provide an improved seismic system and method. It is well known that the loading of an acoustic source is determined by the impedance at the surface of the radiator, wherein impedance is defined as the ratio of acoustic pressure to the particle velocity. It can also be shown that the impedance takes the form of a complex function that is the addition of a purely resistive term and a reactive term. It is also known that the resistive term and the reactive term can be expressed in terms of the characteristic impedance of the geologic medium, the dimensions of the radiator source and other parameters. And, it can be readily shown that when the dimensions of the source are large, the value of the resistive term approaches the characteristic impedance of the geologic medium, and that the reactive term approaches zero. This same general result is obtained for various configurations of radiator sources. The result is that efficient coupling of an acoustic source to a geologic medium occurs when the resistive term predominates and approaches the characteristic impedance of the medium, this also being the case where the reactive term approaches zero. A conclusion is drawn that the configuration of the radiator itself is less important than the dimensions of the radiator or source. Although the dimensions of the radiator source must attain or approach the magnitude of the propagation wavelength in the geologic medium to achieve maximum efficiency of transfer, it will also be seen that use of the gel in any dimensions enchances the efficiency of radiation in the earth because of its peculiar characteristics. However, because of the flexibility of design afforded by use of the gel, and the ability to pour into liquid form to set up as a gel, advantage can be taken of the ability to increase the dimensions of the source to achieve maximum efficiency of coupling, as will be demonstrated by some of the more sophisticated seismic designs below.

At least two other characteristics of the gel material are important and should be noted, which are the amplification properties of the gel obtained by operating at resonant frequencies, and the useful bandwidth of frequencies that can be transmitted through the gel.

It can be shown that the transmissibility, or the ratio of transmitted to input force of the gel can be expressed in terms of the fraction of critical damping of the gel. Experimental data indicates that internal damping of a 10% solution of the gel, (percentage by weight of the dry powder) in a stainless steel beaker of dimensions 8 inches in diameter and 9 inches in height constructed from 0.020 gage material will be about 0.15% of critical. For such a value of the percent of critical damping, amplifications for the gel in a range of from 3 to 5 can be expected.

The useful bandwidth of frequencies of the gel system is of interest. It can be shown that the Q of a resonant system can be related to the internal damping and can also be expressed in terms of the frequency of resonance and the effective bandwidth. For typical parameters of the gel material as given above and assuming an operating frequency of about one hundred cycles per second, the effective bandwidth is about 30 c.p.s. Therefore, when utilizing such a coupler in a communication system employing about 100% FM modulation, at least twenty bits of information per second can be transmitted.

In any given coupler design utilizing this resonant effect or any of the other effects described in any of the configurations mentioned, there are trade off parameters for size, shape, elasticity, damping, and velocity parameters in the gel. For example, if the resonant effect is being used the mass and elasticity of the gel material must be considered. In a simple spring-mass-damper system, the resonant frequency is given by the equation $$f = \frac{1}{2\pi}\sqrt{\frac{K}{m}}$$

where K is an elastic constant and $m$ is the mass involved. In the gel material, the elastic constant, K, is proportional to the amount of additive powder used to construct the gel. Since the base fluid, water, makes up most of the mass, for a given coupler of given size nad shape the resonant frequency can be adjusted by varying the amount of additive used to make the gel material. We have found that as little as 2.0 to 3.0 percent of additive in water will provide efficient coupler designs when the size is small. For larger coupler designs much greater percentages of the additive may be required. In general, seismic shear wave and compressional wave velocities in the gel are proportional to elasticity. These parameters must also be considered in any given design to utilize effects other than the resonant characteristics of the coupler.

Damping of the gel material is quite low as mentioned above. In some cases it may be desirable to increase the internal damping or friction. Utilizing the resonant mode discussed above may at times require more damping to decrease the Q of the resonant system and therefore, increase the effective bandwidth. Such increases in damping can be obtained by placing solid additives in the fluid gel material prior to formation of the solid gel material, wherein such materials as carbon particles, flour, and in particular, stringy fibers such as cotton flock are suitable for this purpose. The amount of solid additive depends upon the degree of friction desired.

Referring again to FIGURE 1, it will be considered that the radius $a_1$ of the gel plug is small as compared to the wavelength of propagation of the seismic energy within the earth. Therefore, the seismic source can be considered a "simple" or "small" source, so that maximum coupling efficiency is not achieved as compared to more sophisticated designs of larger dimensions. This is not to say that the configuration shown in FIGURE 1 is not more efficient than conventional sources or seismic systems, as will be shown. As the shaker 28 operates to vibrate the surface 25 of the gel plug at the desired frequency, the particle velocity and displacement of the gel at this surface is relatively large, since the gel is not constrained at this point. This force or vibratory motion is transmitted through the gel plug to the interface 22 between the gel plug and the geologic medium, wherein very little, if any, friction losses or damping is incurred. The body of gel material acts as the equivalent of a transformer for this vibratory motion in that the particle velocity and displacement of the gel and the geologic medium at the interface 22 is relatively small, but is spread over a much larger area. At the location of the vibrator at the top surface of the gel. the gel is not constrained and is free to move in response to the vibrator motion, whereas the gel along the interface 22 is constrained from large movement. Amplification is achieved when operating near the resonant frequency of the gel plug system, and a relatively large force is transmitted to the geologic medium, along with a much greater degree of impedance matching between the gel plug and geologic medium at the interface as compared to the shaker being positioned directly against the geologic medium.

Figure 2:
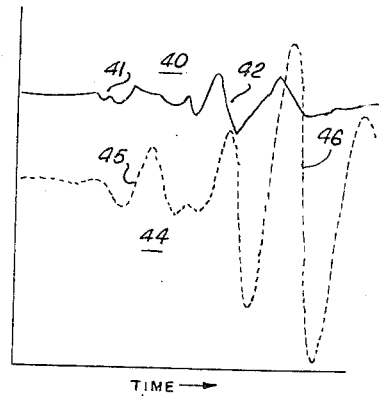

Simple field experiments indicate the effectiveness of the gel system as shown in FIGURE 2. Each of the curves 40 and 44 represents, in graphical representation form, seismic energy propagation through the earth and received by a geophone as derived from a seismic source. In curve 40, a geophone was placed in direct contact with the earth's surface, and a seismic disturbance was created at a given distance from the geophone. As the seismic disturbance is created and the geophone intercepts the transmitted seismic energy propagated through the earth, a suitable display means shows the geophone output response to transmitted energy indicated as a primary P wave 41, followed by a secondary wave 42 that represents energy transmitted through the earth along a different path.

An otherwise identical test conducted with the geophone placed on a gel plug with the same seismic disturbance and distance of separation shows that the initial energy, or P wave, received by the geophone is amplified as a signal 45. The same secondary wave 46 is greatly amplified over the secondary wave 42. Obviously, amplification has been obtained for both the P and secondary waves using the gel plug, with the amplification of the secondary wave being about 10 or 12. Resonance effects of the gel plug can account for the amplification of the magnitude observed, but it is also possible to attribute these effects to an expanded source effect, as will be described below in conjunction with FIGURE 3.

It will be seen that amplification and increased efficiency of coupling is achieved for the seismic source as shown in FIGURE 1, and that a reciprocal effect to that of the seismic source is achieved with a geophone or pick-up positioned in contact with a gel plug. Thus the increased efficiency and the coupling effect is obtained whether for converting mechanical vibratory energy into seismic energy or vice-versa.

Figure 3:
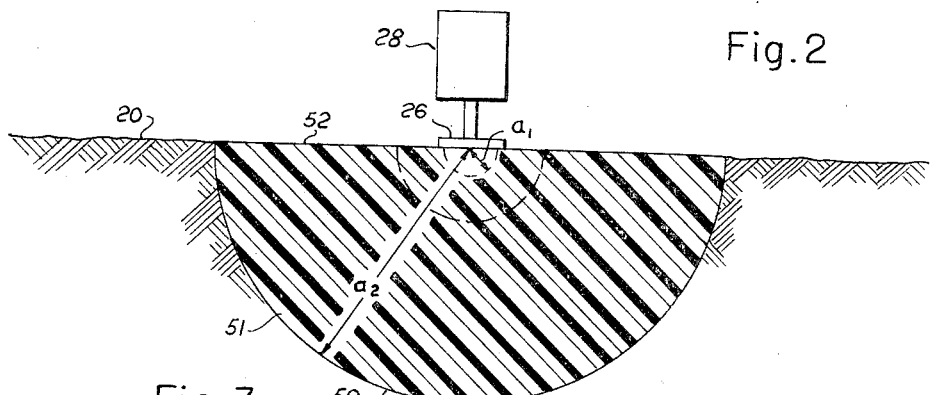
FIGURE 3 is a side elevational view, in section, of an expanded "simple" seismic source that employs a body of the gel of increased dimension poured into the earth to form a large plug in physical contact with the earth, and a mechanical shaker or vibrator, shown schematically, positioned in contact with the gel.

Because of the flexibility of use of the gel by being able to pour in the liquid form to set up in any desired shape and size, an expanded source can be effectively and economically provided as shown in the side elevational view, in section, of FIGURE 3. The reasons for providing an expanded source of increased dimensions has been discussed above, where it can be shown that the power radiated into the geologic medium from the source is a function of both the dimensions of the source and the maximum particle velocity attainable without fracture. In particular, the power radiated into the earth is proportional to the fourth power of the radius of a hemispherical source and the square of the maximum particle velocity. Thus by increasing the radius of a simple source to a larger radius $a_2$ several times larger than the smaller radius $a_1$, the power can be increased many fold. Such an expanded source is shown in FIGURE 3, wherein a cavity is made in a geologic medium to provide an interface 50 between the geologic medium 20 and a mass 51 of the gel poured into the cavity to set up as a gel. The shaker 28 is placed on the surface 52 of the gel mass at the face of the shaker plate 26 as before, whereby the portion of the gel in contact with the shaker plate is essentially unrestricted as to movement and is vibrated in accordance with the shaker plate. Consequently, a high particle velocity and displacement at this point can be achieved. On the other hand, the gel is constructed from large amplitude movement along the interface 50. Because of the peculiar characteristics of the gel, essentially no energy is lost between the shaker plate and the interface 50, but rather a spreading out of the energy is effetced over a large dimension that can be made to approach the wavelength, or half wavelength, of the seismic energy to be propagated within the geologic medium. The theory and results achieved for an expanded source has already been discussed above.

Figure 4:
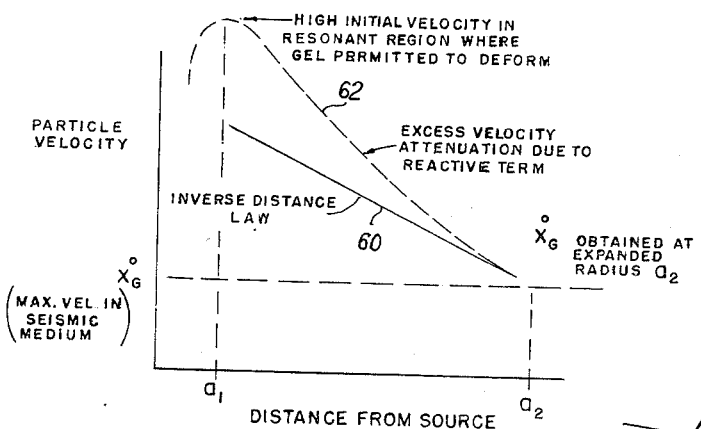
FIGURE 4 is graphical representation of the particle velocity within the gel plug as a function of distance from the mechanical vibrator for the system shown in FIGURE 3.

A graphical representation of the particle velocity 62 as a function of distance from the vibrator in the expanded source gel plug of FIGURE 3 is shown in FIGURE 4. This particle velocity is compared, for reference purposes, with the inverse square law 60, the latter being the relationship of particle velocity as a function of distance from an acoustic source through a hemispherical radiator. In such a case, the particle velocity decreases linearly as a function of distance from the source, wherein the intensity is proportional to the square of the pressure, and the pressure is proportional to the particle velocity.

In the gel system, a high initial particle velocity can be produced at the source point, wherein the velocity is attenuated more rapidly than the inverse square law as a function of distance from the source, due primarily to the reactive term mentioned above. Some attenuation results from friction losses within the gel, although this is a minimum. Because of the elasticity of the gel, the particle velocity in the gel at the shaker can be increased to the extent necessary in order to achieve the maximum permissible velocity $\dot{x}_G$ of the seismic medium at the interface 50 without fracturing the medium. This is desirable to maximize the power of energy radiated into the medium. Thus at radius $a_2$, or at the gel seismic medium interface, the gel particle velocity is equal to the maximum seismic medium velocity $\dot{x}_G$.

This invention contemplates the use of the gel material both at the seismic source in conjunction with the low impedance mechanical vibrator and at the geophone pick-up. In addition, the invention contemplates the use of the gel in any application where energy of an acoustic or vibratory nature is to be transmitted, coupled or radiated from one medium to another, or from one body to another. Referring to the side elevational view, in section, of FIGURE 5, a simple seismic system is shown, wherein a cavity 70 is formed in a geologic medium into which is poured a gel plug 71. A vibrator 28 constituting a seismic source is fixed in contact with the surface 72 of the gel plug at the vibrator plate 26. Similarly, a cavity 74 is formed in the geologic medium 20 at the desired site for receiving the propagated seismic energy into which a gel plug 75 is poured. A geophone 78, or other suitable sensor, is fixed in contact with the top surface 76 of the gel plug 75 for the efficient reception of the propagated seismic energy and reconversion thereof into mechanical vibrations at the geophone.

The gel material can also be used in conjunction with a multiple array source as shown in the side elevational view, in section, of FIGURE 6. Such a multiple array source is a conventional method for expanding the effective size of the seismic source, whereby a multiple array of geophones are conventionally used regardless of the size of the source. Here, several gel plugs 90, 92, 94 (and as many others as desired) are poured in the geologic medium 20 with corresponding shakers 91, 93, 95, respectively, attached thereto and operated from a single imput 96. Similarly, a multiple array of gel plugs 100, 102 (and as many others as desired) are poured in the geologic medium at various sites in spaced relation from the multiple array source, with geophones 101, 103, respectively, fixed in contact with the plugs and connected to a common output line 104.

The methods and configurations shown in FIGURES 5 and 6 are for illustrative purposes only to indicate that the gel material can be used in any conventional seismic system in which a mechanical shaker is employed. The configurations and sizes of the various gel plugs shown in these figures are also for illustrative purposes only, and it is to be understood that these plugs can constitute simple sources, expanded simple sources or any other design and size as heretofore or hereinafter described.

One embodiment of a gel plug configuration that increases the efficiency of coupling has been shown in FIGURE 3, whereby the radius of a hemispherical mass of the gel material is increased to expand the simple source and, if desired, approach the wavelength, or half wavelength, of the seismic energy propagated within the geologic medium. Other configurations to increase the efficiency of coupling can be employed such as that shown in FIGURE 7.

FIGURE 7 illustrates an exponential horn configuration, whereby it is well known to match acoustic impedances with horn configurations. Since the theory of acoustic horn designs is well known, no elaboration on the theory will be made here. It will be remarked, however, that the particle velocities within the horn are related to the respective areas of the throat and mouth of the horn, whereby the particle velocity is greatest at the throat and smallest at the mouth.

This embodiment illustrates an exponential horn configuration of the gel material 110 contained within any suitable outer shell or container 112, with the mouth of the horn configuration disposed in abutting relation with the surface of the geologic medium 20. Although the dimensions of such a horn can be relatively large, the gel material is relatively inexpensive and can be pumped like water, thus making such a large design feasible. To set up this configuration, the container 112 is established in the upright position as shown and filled with the gel material in the liquid form. Upon setting of the gel, the gel is in intimate physical contact with the geologic medium surface and completely fills the horn. The mouth of the horn can also be situated in a cavity in the earth. A shaker 114 is coupled to the gel at the throat of the horn by means of the mechanical vibratory member 116. Any other suitable method to set up this system can also be employed.

At the throat of the horn, the gel material is essentially unrestricted to deformation, thus resulting in a low input impedance to mechanical vibrations created by the shaker. The power radiated by the horn is proportional to the impedance at the input and the square of the particle velocity at the throat. Since the impedance is small, the velocity must be relatively large to introduce a reasonable amount of power into the geologic medium. A high particle velocity at the throat of the horn can be readily achieved with the gel material because of its characteristics. These characteristics have been previously described and noted as the large magnitude of excursion of the particles when permitted to deform without fracture, with no considerable damping or internal friction losses. Thus a relatively large power may be introduced at the throat of the horn by the ability to create a high particle velocity by excitation. At the mouth of the horn this energy is spread coherently over a large area with displacements and velocities consistent with the elastic and fracture properties of the medium.

A further explanation of the gel coupler design is shown in the electrical analog of FIGURE 8, whereby a complete impedance matching system is provided. The mechanical vibrator is represented by an oscillator 120 connected in series with an impedance or resistance 122, the combination of which constitutes a low impedance vibrator source. Coupled to this source across terminals 123 and 124, also denoted the low impedance input, is the gel material element that utilizes resonant and transformer effects in the expanded simple source or gel horn configuration. At the input of the gel configuration, the gel element constitutes the equivalent of a capacitor 126 connected in parallel with an inductance 130, which represents the resonant effect described earlier. The gel element is also characterized by a transformer effect denoted by the transformer 128 having a secondary 132 coupled to the primary 130 through a core 134, whereby the primary 130 constitutes the inductance previously noted. Thus there is an impedance increase from the input of the gel material within the body of the gel material itself. At the opposite extremity of the gel element where the dimensions are much larger and the gel element is constrained from deformation, the output is represented across output terminals 136 and 138 through a transformer 140 having a primary 142 and secondary 144 coupled thereto through a core 146. This is the electrical analog of the transformer effect of a multiple source array, expanded simple source or horn configuration.

At the interface between the gel horn with the geologic medium as shown in FIGURE 7, the equivalent interface losses are shown as a variable resistance 152 coupled across the output terminals 148 and 150. Passing through the interface, the geologic or high impedance medium is represented by an impedance or resistor 160 connected across the output terminal 156 and 158, also denoted as the high impedance output. The interface loss resistance 152 has been denoted as variable, with a variable tap 154, since this parameter can be increased or decreased as desired by proper design.

A lens shaped gel plug is shown in the side elevational view, in section, of FIGURE 9. Propagation velocities of seismic waves in the gel coupler will be a function of the amount of additive and thus is variable. When these velocities are adjusted to be lower than those in the surrounding medium, a lens effect can be utilized to aid in coupling operation. Snell's law predicts the refraction of wave energy across velocity interfaces. Referring to this figure, a gel plug 172 in the form of paraboloid or ellipsoid, for example, is poured into an appropriately shaped cavity 170. The shape and physical properties of the plug are such that a plane wave 176 represented by parallel rays 178 of acoustic energy is refracted as rays 180 to focus the energy at a focal point 175. Conversely, energy input at the focal point is radiated into the geologic medium 20 in the form of a plane wave front. A seismometer 174 is situated at the focal point to receive the focused energy, or conversely, a mechanical shaker is placed at this point.

An example of improved coupling at the input of a seismic system demonstrated in field experiments will be given using a 50-pound vibrator. A coupler was constructed in the earth by pouring the gel material while in a fluid state into a hole prepared in the earth. This was an approximate hemispherical cavity with a 20-inch diameter and a depth of 8 inches. A 15% solution was formed as a solid coupler in intimate contact with the earth. Test runs were made with the shaker introducing seismic energy from 20 to 50 c.p.s. directly into the earth and then through the coupler. Force applied to the earth or coupler was monitored by a force gage attached between the vibrator and a driving plate, and seismic energy in the earth was monitored at 25 feet and greater distances with geophones. Appropriate amplification, monitoring, and measuring devices were also employed.

Four times as much force was introduced into the earth without wave shape distortion that would ordinarily result from inelastic effects when the coupler was utilized. Using the same input force in either case, up to 10 db improvement at certain frequencies was measured when using the coupler. Overall distance of seismic wave transmission was increased from 25 feet to 75 or 100 feet for a given signal to noise level.

Improved coupling at the output of a seismic system was also demonstrated in field experiments using a gel coupler in the earth and a geophone mounted on top of the coupler. A second geophone mounted on the earth provided a comparison. A seismic signal was generated by dropping a weight at a distance of 25 feet. A time break was provided by a geophone located near the source point.

In repeated tests the geophone on the coupler showed greater signal to noise ratio than the geophone on the earth. P-wave energy presumably traveling a refraction path was stronger and more easily identified. When the distance of the source was increased, the first break energy from the geophone of the coupler was useful at greater distances than that coming from the geophone on the earth. Likewise, secondary energy traveling a slower path along the surface of the earth was enhanced. Measurement of peak to peak amplitudes of secondary energy from both cases showed from 10 to 15 db signal improvement.

Another test utilizing the vibrator to generate discrete frequency energy indicated that the geophone mounted on the coupler had a relatively flat response over a range of frequencies of 25 to 45 c.p.s.

Another design configuration of gel material seismic source is shown in the side elevational view, in section, of FIGURE 10, wherein a relatively deep bore hole 190 is drilled in the geologic formation and completely filled with the gel material 192. The bore hole is drilled to a depth to approximate or equal the wavelength, or half wavelength, of the seismic energy to be propagated within the geologic formation 20, so that very high efficiency of coupling can be achieved. Again, the mechanical vibrator 194 is attached to the surface of the gel plug by means of the vibrator member 196. This particular design and configuration takes advantage of the dimensions of the source rather than the configuration, although the configuration is quite suitable to effect efficient coupling.

The analyses of elements and systems described above, and especially the theory related thereto, have been primarily directed to seismic source input configurations. As already noted, a similar situation exists at the output of a seismic system where the seismic energy is converted back into mechanical vibratory motion or energy. By reciprocity, any improvement in transfer impedance at the input can be utilized as well in the output situation.

Several specific embodiments of impedance matching configurations for the efficient conversion and reconversion of vibratory energy into seismic energy and vice-versa have been described. It will be understood, however, that many variations and substitutions that do not depart from the true scope and intent of the invention will become readily apparent to those skilled in the art, including many different applications thereof.

What is claimed is:
1. A method of coupling a mechanical vibrator with a geologic medium comprising the steps of:
   (a) forming an excavation in said geologic medium;
   (b) placing a liquid solution within said excavation, said liquid solution comprising water, catalyst and a mixture of acrylamide and N,N'-methylenebisacrylamide;
   (c) allowing said liquid solution to form a gel; and
   (d) placing said mechanical vibrator in intimate contact with said gel.

2. The method as set forth in claim 1 wherein said mixture of acrylamide and N,N'-methylenebisacrylamide comprises from about 0.5% to about 50.0% by weight of said liquid solution.

3. A method of coupling a seismic energy source with a geologic medium comprising the steps of:
   (a) placing a liquid solution in contact with said geologic medium, said solution comprising water, catalyst and a mixture of acrylamide and N,N'-methylene bisacrylamide;
   (b) allowing said solution to form a gel; and
   (c) placing said seismic energy source in intimate contact with said gel.

4. The method as set forth in claim 3 wherein said seismic energy source is a mechanical vibrator.

5. The method as set forth in claim 3 wherein said mixture of acrylamide and N,N-methylene bisacrylamide comprises from about 0.5% to about 50.0% by weight of said liquid solution.

6. A method of coupling a seismic sensor with a geologic medium comprising the steps of:
   (a) placing a liquid solution in contact with said geologic medium, said solution comprising water, catalyst and a mixture of acrylamide and N,N'-methylene bisacrylamide;
   (b) allowing said solution to form a gel; and
   (c) placing said seismic sensor in intimate contact with said gel.

7. The method as set forth in claim 6 wherein said seismic sensor is a geophone.

8. The method as set forth in claim 6 wherein said mixture of acrylamide and N,N'-methylene bisacrylamide comprises from about 0.5% to about 50.0% by weight of said liquid solution.

References Cited
UNITED STATES PATENTS

| | | | |
|---|---|---|---|
| 2,281,751 | 5/1942 | Cloud | 181—.5 |
| 3,363,720 | 1/1968 | Mifsud et al. | 181—.5 |
| 3,367,443 | 2/1968 | Mayne | 181—.5 |
| 1,117,766 | 11/1914 | Berger | 340—8 |
| 1,440,361 | 12/1922 | Hopwood | 340—8 |
| 2,801,984 | 8/1957 | Morgan et al. | 252—8.5 |

BENJAMIN A. BORCHELT, Primary Examiner
JAMES FOX, Assistant Examiner

U.S. Cl. X.R.
252—8.5